(12) United States Patent  
Sambhwani

(10) Patent No.: US 9,191,867 B2
(45) Date of Patent: Nov. 17, 2015

(54) DYNAMIC SWITCHING BETWEEN DC-HSDPA AND SFDC-HSDPA

(75) Inventor: Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 13/227,858

(22) Filed: Sep. 8, 2011

(65) Prior Publication Data

US 2012/0076021 A1    Mar. 29, 2012

Related U.S. Application Data

(60) Provisional application No. 61/381,395, filed on Sep. 9, 2010, provisional application No. 61/381,877, filed on Sep. 10, 2010.

(51) Int. Cl.
*H04W 36/00* (2009.01)
*H04W 36/30* (2009.01)
*H04W 36/38* (2009.01)

(52) U.S. Cl.
CPC ......... *H04W 36/0072* (2013.01); *H04W 36/30* (2013.01); *H04W 36/38* (2013.01)

(58) Field of Classification Search
CPC .. H04W 36/0072; H04W 36/30; H04W 36/38
See application file for complete search history.

(56) References Cited

U.S. PATENT DOCUMENTS

| 8,265,685 | B2* | 9/2012 | Vikberg et al. ............... 455/525 |
| 2009/0047954 | A1* | 2/2009 | Tenny et al. ................ 455/435.3 |
| 2010/0034176 | A1* | 2/2010 | Heo et al. ...................... 370/335 |
| 2010/0222059 | A1* | 9/2010 | Pani et al. ..................... 455/436 |

(Continued)

FOREIGN PATENT DOCUMENTS

| CN | 101455113 A | 6/2009 |
| CN | 101594656 A | 12/2009 |

(Continued)

OTHER PUBLICATIONS

Qualcomm "R1-104157—On deploying DC-HSDPA UEs in Single Frequency Networks" presented at "3GPP TSG RAN WG1 Meeting #61-bis" on Jul. 2, 2010.*

(Continued)

*Primary Examiner* — Jung Park
*Assistant Examiner* — Chuong M Nguyen
(74) *Attorney, Agent, or Firm* — Darren M. Simon

(57) ABSTRACT

A method, apparatus, computer program product, and processing system provide for dynamic selection of a secondary serving cell among various available secondary serving cells, be they in the same frequency as the primary serving cell (as in SFDC-HSDPA), in a different frequency but in the same band as the primary serving cell (as in DC-HSDPA), or in a different band from the primary serving cell (as in DB-DC-HSDPA). Here, the UE may be preconfigured for each of the available secondary serving cells, and may receive a configuration message to select between one of them based on factors such UE battery consumption, CQIs corresponding to the available secondary serving cells, loading of the secondary serving cells, or UE power headroom limitations. Thus, an advanced UE capable of receiving the plurality of technologies may benefit from dynamically selecting the best available secondary serving cell in accordance with the factors.

30 Claims, 10 Drawing Sheets

(56) References Cited

U.S. PATENT DOCUMENTS

| | | | |
|---|---|---|---|
| 2010/0296446 A1 | 11/2010 | Zhang et al. | |
| 2011/0002283 A1 | 1/2011 | Drugge et al. | |
| 2011/0014920 A1* | 1/2011 | Nylander et al. | 455/442 |
| 2011/0076999 A1* | 3/2011 | Kazmi et al. | 455/423 |
| 2011/0110239 A1* | 5/2011 | Blanz et al. | 370/241 |
| 2011/0201367 A1 | 8/2011 | Aminaka et al. | |
| 2011/0228756 A1* | 9/2011 | Kim et al. | 370/338 |

FOREIGN PATENT DOCUMENTS

| | | | | |
|---|---|---|---|---|
| EP | 1773009 A2 | 4/2007 | | |
| WO | 2007050238 A1 | 5/2007 | | |
| WO | 2009155480 A1 | 12/2009 | | |
| WO | WO2009/148381 | * | 12/2009 | H04B 17/00 |
| WO | WO2009/148381 A1 | * | 12/2009 | H04B 17/00 |

OTHER PUBLICATIONS

Kazmi et al ("Method and Arrangements in a Mobile Communication Network"—WO2009148381—published on Dec. 10, 2009).*

Kazmi, "Method and Arrangements in a Mobile Communication Network"—WO2009148381 published Dec. 10, 2009.*

Qualcomm "R1-104157 on deploying DC-HSDPA UEs in Single Frequency Networks" published at "3GPP TSG RAN WG1 Meeting #61-bis" on Jul. 2, 2010.*

3rd Generation Partnership Project (3rd Generation Partnership Project; Technical Specification Group Radio Access Network; Radio Resource Control (RRC); 61 pages; Protocol specification (Release 10) published Jun. 2010.*

International Search Report and Written Opinion—PCT/US2011/051029—ISA/EPO—Dec. 13, 2011.

Ericsson, ST-Ericsson (Nov. 2010), Multi-point transmission techniques for HSPA, Proceedings from 3GPP TSG RAN WG1 Meeting #62bis: Jacksonville, FL: 3GPP, 1-16.

Qualcomm Incorporated: "On deploying DC-HSDPA UEs in Single Frequency Networks", R1-104157, 3rd Generation Partnership Project (3GPP), Mobile Competence Centre ; 650, Route Des Lucioles ; F-06921 Sophia-Antipolis Cedex ; France, vol. RAN-WG1, no. Dresden, Germany; 20100629 Jul. 5, 2010, XP002633072, Retrieved from the Internet: URL:http://www.3gpp.org/ftp/tsg_ran/WG1_RL 1/TSGR1_61b/Docs/R1-104157.zip [retrieved on Apr. 14, 2011].

* cited by examiner

DYNAMIC SWITCHING BETWEEN DC-HSDPA AND SFDC-HSDPA

CROSS-REFERENCE TO RELATED APPLICATIONS

This application claims priority to and the benefit of provisional patent application No. 61/381,395, filed in the United States Patent and Trademark Office on Sep. 9, 2010, and provisional patent application No. 61/381,877, filed in the United States Patent and Trademark Office on Sep. 10, 2010, the entire contents of which are incorporated herein by reference.

BACKGROUND

1. Field

Aspects of the present disclosure relate generally to wireless communication systems, and more particularly, to dynamically selecting among a plurality of available secondary serving cells for a user equipment capable of receiving multiple serving cells in more than one technology.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance UMTS technologies not only to meet the growing demand for mobile broadband access, but to advance and enhance the user experience with mobile communications. For example, recent releases of 3GPP standards include Dual Cell (DC)-HSDPA, wherein a UE may receive dual transport blocks in different 5-MHz carriers (in the same band or in different bands) transmitted by the same Node B. In addition, more recent advances undergoing ongoing development within 3GPP include single-frequency, dual cell (SFDC)-HSDPA, wherein the UE may receive dual transport blocks from different sectors (transmitted by the same Node B or by disparate Node Bs) in downlink transmissions utilizing the same carrier frequency. With these and other paradigms including dual-frequency dual-cell HSDPA, which is similar to DC-HSDPA except that the dual transport blocks in different carriers may be transmitted by disparate Node Bs, there may arise scenarios where a particular UE configured for many or even all of these functionalities may benefit from selecting between the various technologies in accordance with any number of factors.

SUMMARY

Thus, various aspects of the present disclosure provide for dynamic selection of a secondary serving cell among various available secondary serving cells, be they in the same frequency as the primary serving cell (as in SFDC-HSDPA), in a different frequency but in the same band as the primary serving cell (as in DC-HSDPA), or in a different band from the primary serving cell (as in DB-DC-HSDPA). Here, the UE may be preconfigured for each of the available secondary serving cells, and may receive a configuration message to select between one of them based on factors such UE battery consumption, CQIs corresponding to the available secondary serving cells, loading of the secondary serving cells, or UE power headroom limitations. Thus, an advanced UE capable of receiving the plurality of technologies may benefit from dynamically selecting the best available secondary serving cell in accordance with the factors.

For example, one aspect of the disclosure provides a method of dynamically switching between secondary serving cells. Here, the method includes transmitting a primary serving cell at a first carrier frequency to a user equipment (UE), preconfiguring the UE to receive a first secondary serving cell at a second carrier frequency and a second secondary serving cell at the first carrier frequency, and transmitting a configuration message to the UE to receive data from at least one of the first secondary serving cell or the second secondary serving cell.

Another aspect of the disclosure provides a method of wireless communication that includes receiving data over a primary serving cell at a first carrier frequency, receiving preconfiguration information to preconfigure the UE to receive at least one of a first secondary serving cell at a second carrier frequency or a second secondary serving cell at the first carrier frequency, receiving a configuration message for the UE to receive data from a selected secondary serving cell of the first secondary serving cell or the second secondary serving cell, and receiving data over the selected secondary serving cell.

Yet another aspect of the disclosure provides an apparatus for dynamically switching between secondary serving cells. Here, the apparatus includes means for transmitting a primary serving cell at a first carrier frequency to a UE, means for preconfiguring the UE to receive a first secondary serving cell at a second carrier frequency and a second secondary serving cell at the first carrier frequency, and means for transmitting a configuration message to the UE to receive data from at least one of the first secondary serving cell or the second secondary serving cell.

Still another aspect of the disclosure provides an apparatus for wireless communication that includes means for receiving data over a primary serving cell at a first carrier frequency, means for receiving preconfiguration information to preconfigure the UE to receive at least one of a first secondary serving cell at a second carrier frequency or a second secondary serving cell at the first carrier frequency, means for receiving a configuration message for the UE to receive data from a selected secondary serving cell of the first secondary serving cell or the second secondary serving cell, and means for receiving data over the selected secondary serving cell.

Another aspect of the disclosure provides a computer program product that includes a computer-readable medium. Here, the computer-readable medium includes instructions for causing a computer to transmit a primary serving cell at a first carrier frequency to a UE, instructions for causing a computer to preconfigure the UE to receive a first secondary serving cell at a second carrier frequency and a second secondary serving cell at the first carrier frequency, and instructions for causing a computer to transmit a configuration message to the UE to receive data from at least one of the first secondary serving cell or the second secondary serving cell.

Another aspect of the disclosure provides a computer program product that includes a computer-readable medium having instructions for causing a computer to receive data over a primary serving cell at a first carrier frequency, instructions for causing a computer to receive preconfiguration information to preconfigure to receive at least one of a first secondary serving cell at a second carrier frequency or a second secondary serving cell at the first carrier frequency, instructions for causing a computer to receive a configuration message to receive data from a selected secondary serving cell of the first secondary serving cell or the second secondary serving cell, and instructions for causing a computer to receive data over the selected secondary serving cell.

Another aspect of the disclosure provides an apparatus for dynamically switching between secondary serving cells. Here, the apparatus includes at least one processor and a memory coupled to the at least one processor. The at least one processor is configured to transmit a primary serving cell at a first carrier frequency to a UE, to preconfigure the UE to receive a first secondary serving cell at a second carrier frequency and a second secondary serving cell at the first carrier frequency, and to transmit a configuration message to the UE to receive data from at least one of the first secondary serving cell or the second secondary serving cell.

Another aspect of the disclosure provides an apparatus for wireless communication that includes at least one processor and a memory coupled to the at least one processor. Here, the at least one processor is configured to receive data over a primary serving cell at a first carrier frequency, to receive preconfiguration information to preconfigure to receive at least one of a first secondary serving cell at a second carrier frequency or a second secondary serving cell at the first carrier frequency, to receive a configuration message to receive data from a selected secondary serving cell of the first secondary serving cell or the second secondary serving cell; and to receive data over the selected secondary serving cell.

These and other aspects of the invention will become more fully understood upon a review of the detailed description, which follows.

DETAILED DESCRIPTION

Figure 1:
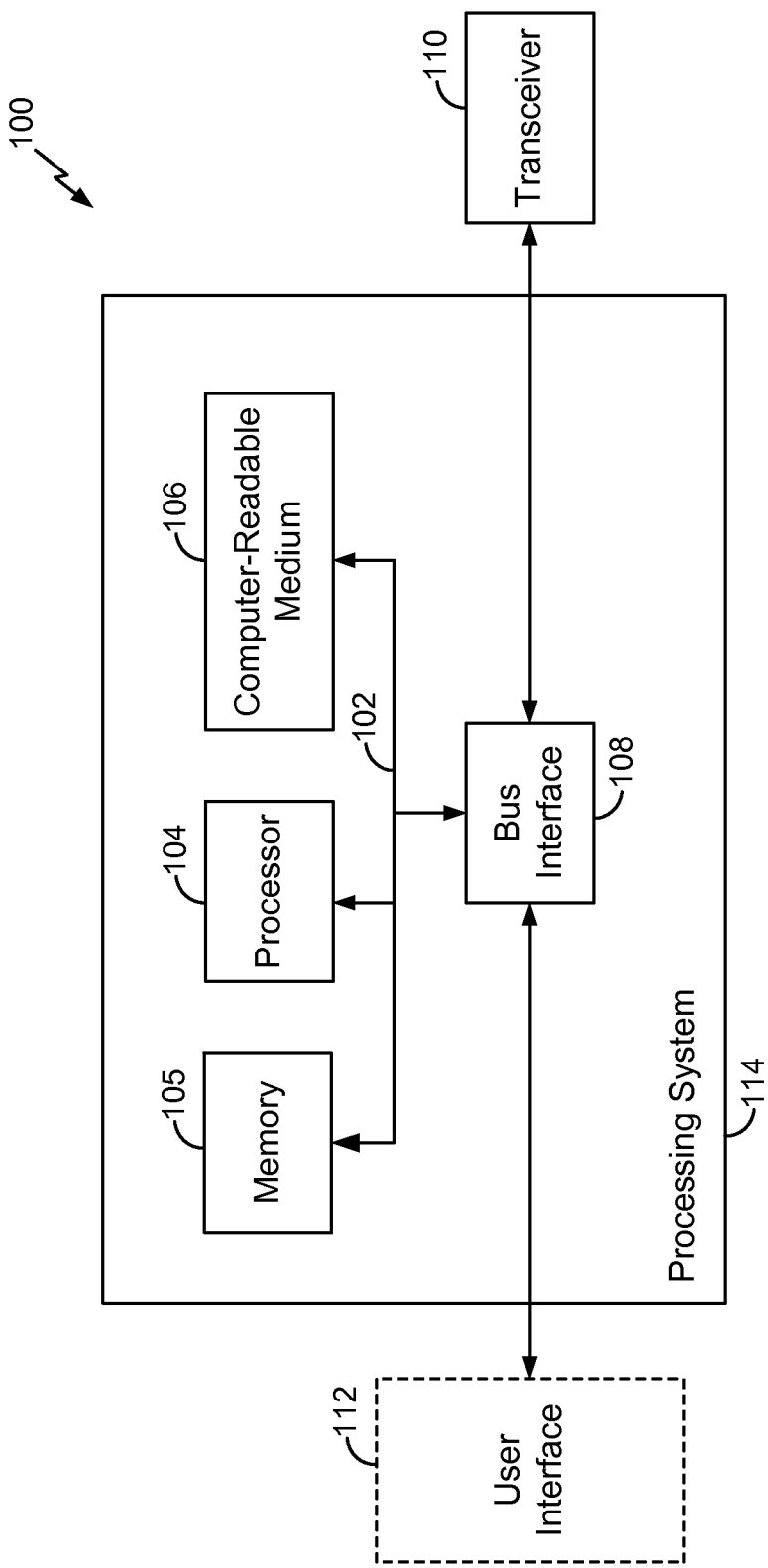
FIG. 1 is a block diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In accordance with various aspects of the disclosure, an element, or any portion of an element, or any combination of elements may be implemented with a processing system that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, a memory 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
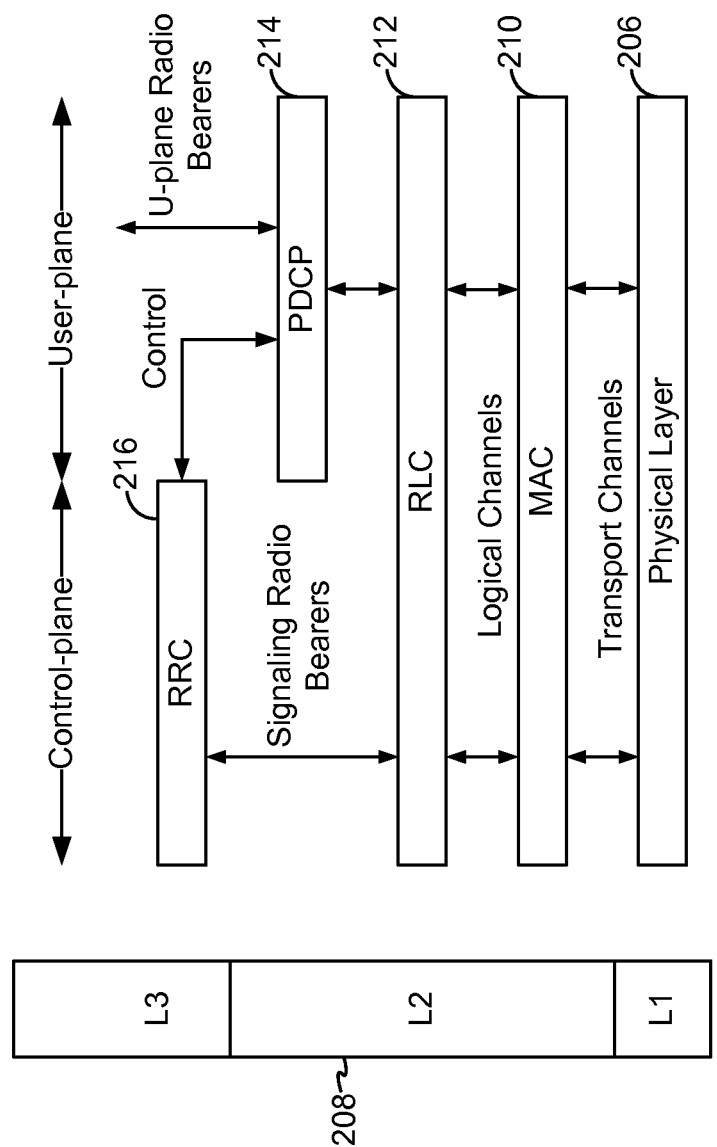
FIG. 2 is a conceptual diagram illustrating an example of a radio protocol architecture for the user and control plane.

In a wireless telecommunication system, the radio protocol architecture between a mobile device and a cellular network may take on various forms depending on the particular application. An example for a 3GPP high-speed packet access (HSPA) system will now be presented with reference to FIG. 2, illustrating an example of the radio protocol architecture for the user and control planes between user equipment (UE) and a base station, commonly referred to as a Node B. Here, the user plane or data plane carries user traffic, while the control plane carries control information, i.e., signaling.

Turning to FIG. 2, the radio protocol architecture for the UE and Node B is shown with three layers: Layer 1, Layer 2, and Layer 3. Layer 1 is the lowest layer and implements various physical layer signal processing functions. Layer 1 will be referred to herein as the physical layer 206. The data link layer, called Layer 2 (L2 layer) 208 is above the physical layer 206 and is responsible for the link between the UE and Node B over the physical layer 206.

At Layer 3, the RRC layer 216 handles the control plane signaling between the UE and the Node B. RRC layer 216 includes a number of functional entities for routing higher layer messages, handling broadcast and paging functions, establishing and configuring radio bearers, etc.

In the illustrated air interface, the L2 layer 208 is split into sublayers. In the control plane, the L2 layer 208 includes two sublayers: a medium access control (MAC) sublayer 210 and a radio link control (RLC) sublayer 212. In the user plane, the L2 layer 208 additionally includes a packet data convergence protocol (PDCP) sublayer 214. Although not shown, the UE may have several upper layers above the L2 layer 208 including a network layer (e.g., IP layer) that is terminated at a PDN gateway on the network side, and an application layer that is terminated at the other end of the connection (e.g., far end UE, server, etc.).

The PDCP sublayer 214 provides multiplexing between different radio bearers and logical channels. The PDCP sublayer 214 also provides header compression for upper layer data packets to reduce radio transmission overhead, security by ciphering the data packets, and handover support for UEs between Node Bs.

The RLC sublayer 212 provides segmentation and reassembly of upper layer data packets, retransmission of lost data packets, and reordering of data packets to compensate for out-of-order reception due to a hybrid automatic repeat request (HARQ).

The MAC sublayer 210 provides multiplexing between logical and transport channels. The MAC sublayer 210 is also responsible for allocating the various radio resources (e.g., resource blocks) in one cell among the UEs. The MAC sublayer 210 is also responsible for HARQ operations.

Figure 3:
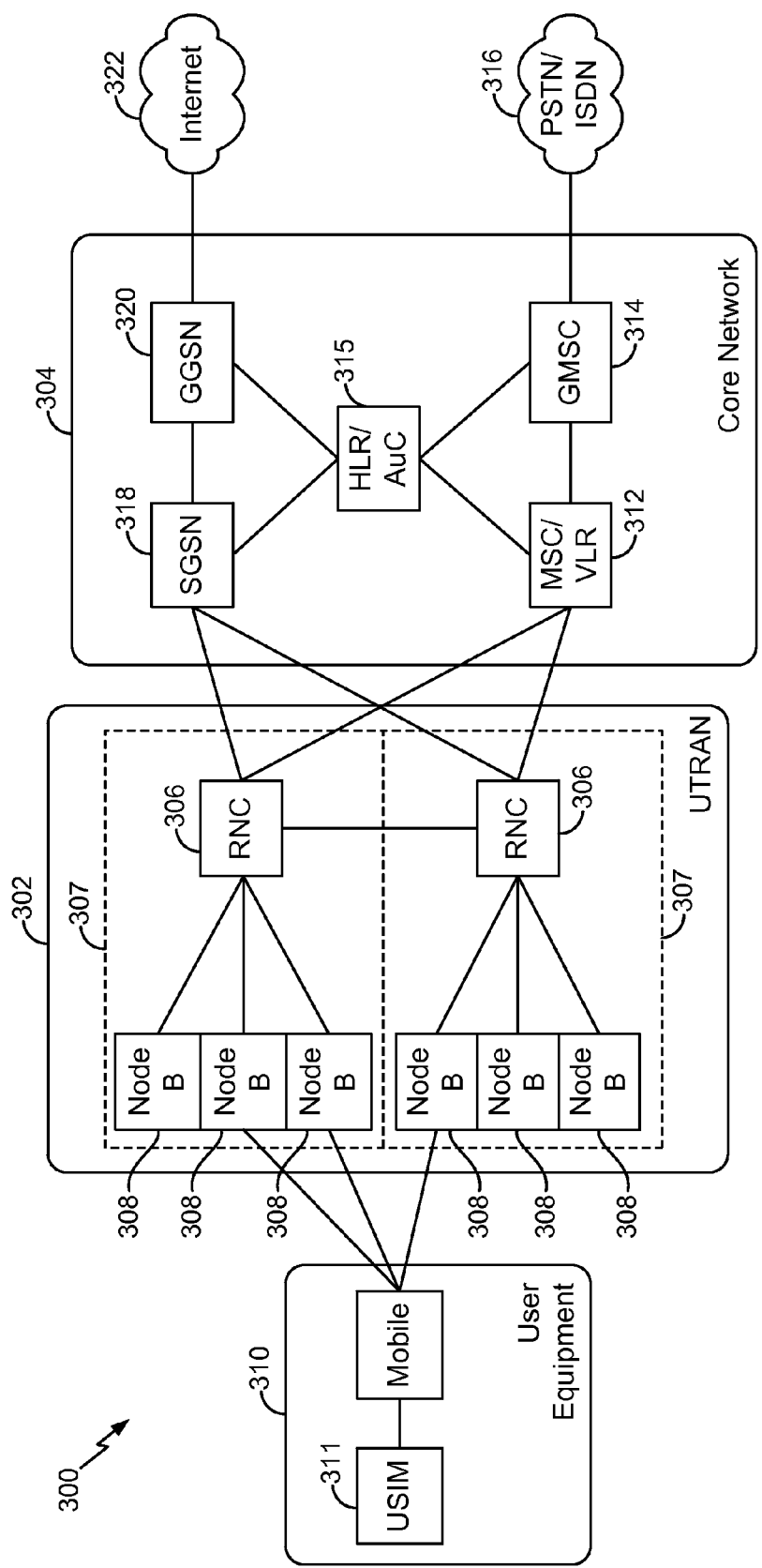
FIG. 3 is a block diagram conceptually illustrating an example of a telecommunications system.

Referring now to FIG. 3, by way of example and without limitation, various aspects of the present disclosure are illustrated with reference to a Universal Mobile Telecommunications System (UMTS) system 300 employing a W-CDMA air interface. A UMTS network includes three interacting domains: a Core Network (CN) 304, a UMTS Terrestrial Radio Access Network (UTRAN) 302, and User Equipment (UE) 310. In this example, the UTRAN 302 may provide various wireless services including telephony, video, data, messaging, broadcasts, and/or other services. The UTRAN 302 may include a plurality of Radio Network Subsystems (RNSs) such as an RNS 307, each controlled by a respective Radio Network Controller (RNC) such as an RNC 306. Here, the UTRAN 302 may include any number of RNCs 306 and RNSs 307 in addition to the illustrated RNCs 306 and RNSs 307. The RNC 306 is an apparatus responsible for, among other things, assigning, reconfiguring and releasing radio resources within the RNS 307. The RNC 306 may be interconnected to other RNCs (not shown) in the UTRAN 302 through various types of interfaces such as a direct physical connection, a virtual network, or the like, using any suitable transport network.

Communication between a UE 310 and a Node B 308 may be considered as including a physical (PHY) layer and a medium access control (MAC) layer. Further, communication between a UE 310 and an RNC 306 by way of a respective Node B 308 may be considered as including a radio resource control (RRC) layer.

The geographic region covered by the RNS 307 may be divided into a number of cells, with one or more radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 308 are shown in each RNS 307; however, the RNSs 307 may include any number of wireless Node Bs. The Node Bs 308 provide wireless access points to a core network (CN) 304 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 310 may further include a universal subscriber identity module (USIM) 311, which contains a user's subscription information to a network. For illustrative purposes, one UE 310 is shown in communication with a number of the Node Bs 308. The downlink (DL), also called the forward link, refers to the communication link from a Node B 308 to a UE 310, and the uplink (UL), also called the reverse link, refers to the communication link from a UE 310 to a Node B 308.

The core network 304 interfaces with one or more access networks, such as the UTRAN 302. As shown, the core network 304 is a GSM core network. However, as those skilled in the art will recognize, the various concepts presented throughout this disclosure may be implemented in a RAN, or other suitable access network, to provide UEs with access to types of core networks other than GSM networks.

The illustrated GSM core network 304 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 304 supports circuit-switched services with a MSC 312 and a GMSC 314. In some applications, the GMSC 314 may be referred to as a media gateway (MGW). One or more RNCs, such as the RNC 306, may be connected to the MSC 312. The MSC 312 is an apparatus that controls call setup, call routing, and UE mobility functions. The MSC 312 also includes a visitor location register (VLR) that contains subscriber-related information for the duration that a UE is in the coverage area of the MSC 312. The GMSC 314 provides a gateway through the MSC 312 for the UE to access a circuit-switched network 316. The GMSC 314 includes a home location register (HLR) 315 containing subscriber data, such as the data reflecting the details of the services to which a particular user has subscribed. The HLR is also associated with an authentication center (AuC) that contains subscriber-specific authentication data. When a call is received for a particular UE, the GMSC 314 queries the HLR 315 to determine the UE's location and forwards the call to the particular MSC serving that location.

The illustrated core network 304 also supports packet-data services with a serving GPRS support node (SGSN) 318 and a gateway GPRS support node (GGSN) 320. GPRS, which stands for General Packet Radio Service, is designed to provide packet-data services at speeds higher than those available with standard circuit-switched data services. The GGSN 320 provides a connection for the UTRAN 302 to a packet-based network 322. The packet-based network 322 may be the Internet, a private data network, or some other suitable packet-based network. The primary function of the GGSN 320 is to provide the UEs 310 with packet-based network connectivity. Data packets may be transferred between the GGSN 320 and the UEs 310 through the SGSN 318, which performs primarily the same functions in the packet-based domain as the MSC 312 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 308 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

Figure 4:
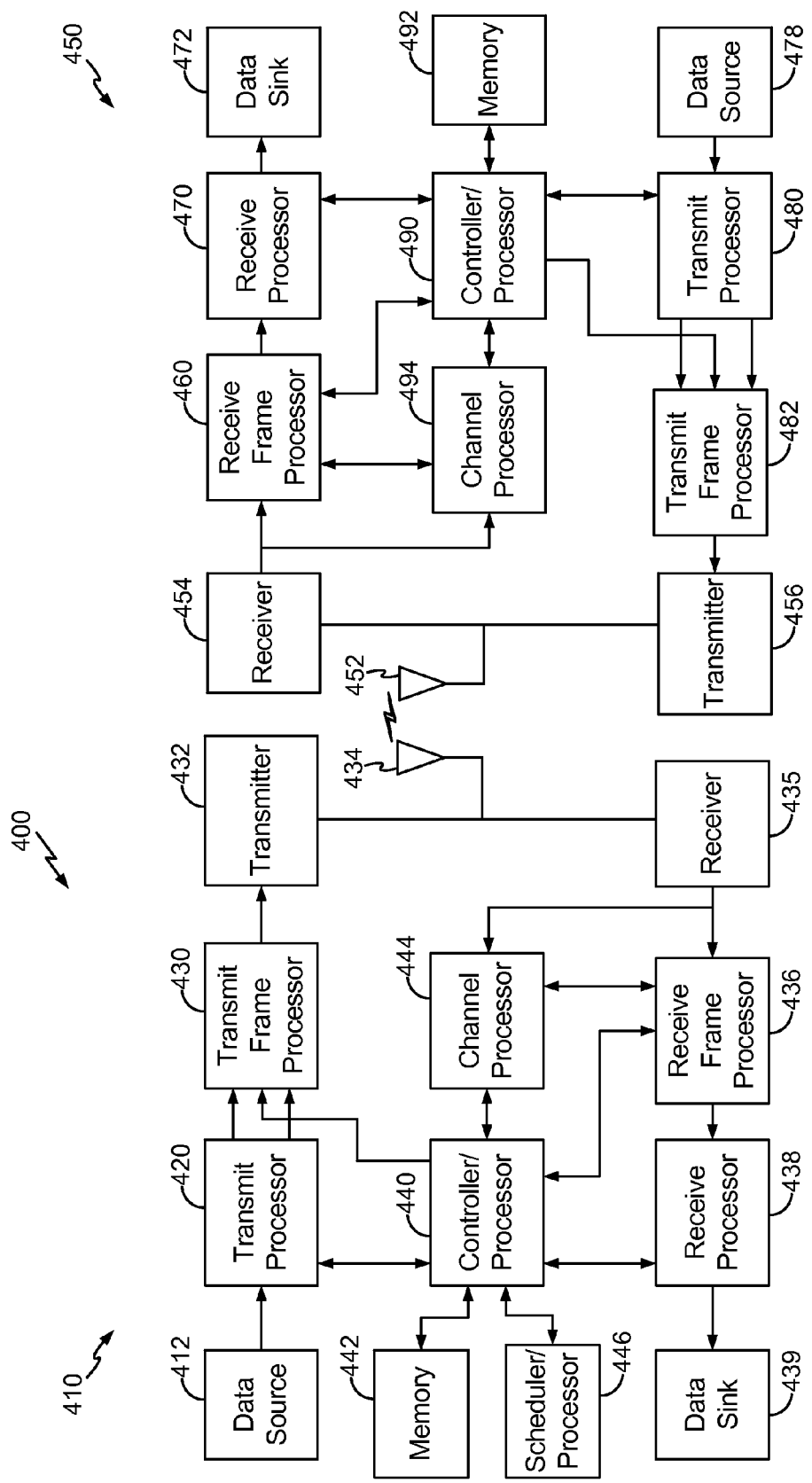
FIG. 4 is a block diagram conceptually illustrating an example of a Node B in communication with a UE in a telecommunications system.

FIG. 4 is a block diagram of an exemplary Node B 410 in communication with an exemplary UE 450, where the Node B 410 may be the Node B 408 in FIG. 4, and the UE 450 may be the UE 410 in FIG. 4. While the illustration provides blocks that may represent a single downlink and uplink, various embodiments in accordance with aspects of the present disclosure may provide for multiple uplink and/or downlink channels, utilizing one or more carrier frequencies. In the downlink communication, a transmit processor 420 at the Node B 408 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

Figure 5:
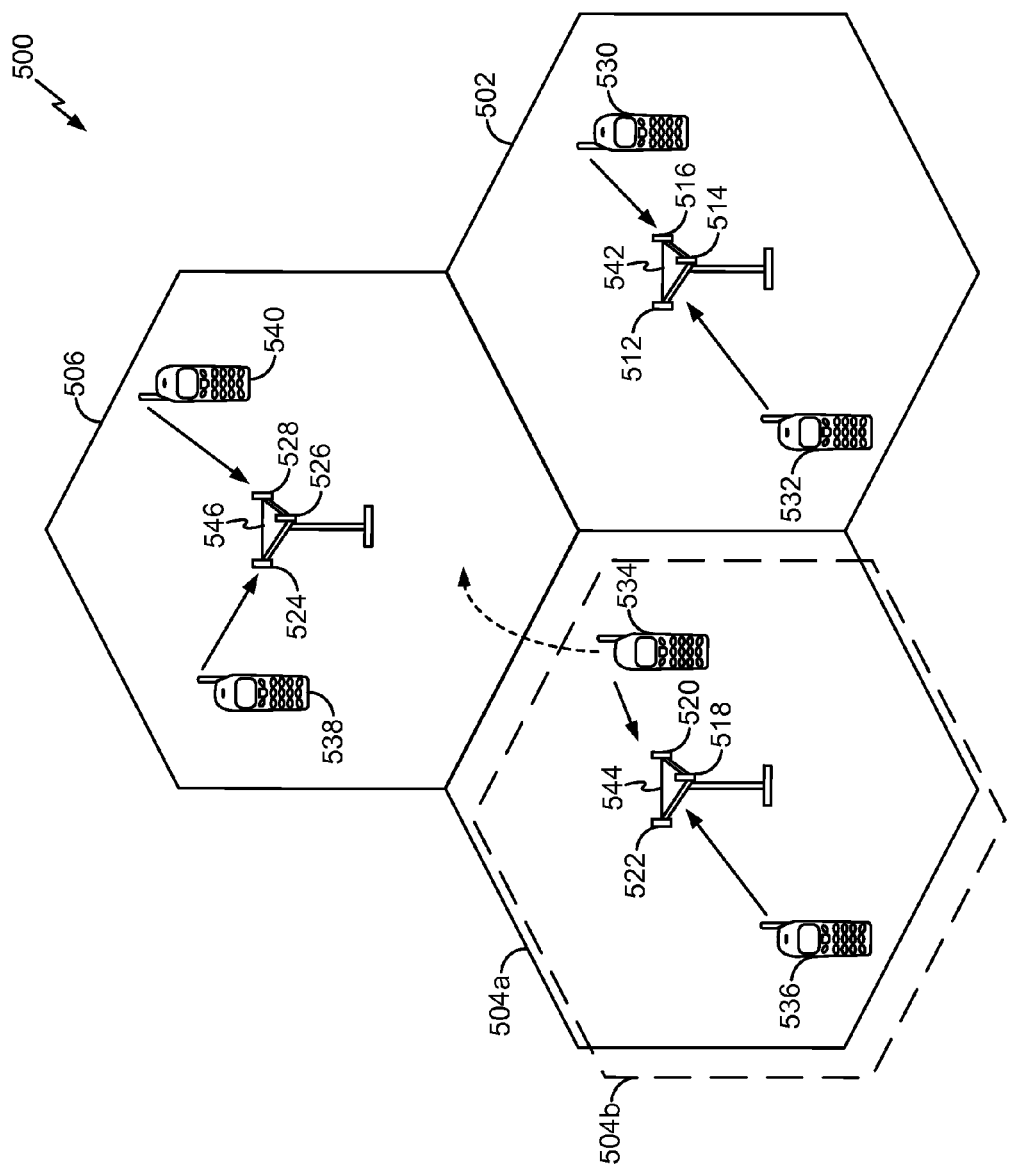
FIG. 5 is a conceptual diagram illustrating an example of an access network.

The various concepts presented throughout this disclosure may be implemented across a broad variety of telecommunication systems, network architectures, and communication standards. Referring to FIG. 5, by way of example and without limitation, a simplified access network 500 in a UMTS Terrestrial Radio Access Network (UTRAN) architecture, which may utilize HSPA, is illustrated. The system includes multiple cellular regions (cells), including cells 502, 504, and 506, each of which may include one or more sectors. Cells and sectors may be defined geographically, e.g., by coverage area, and/or may be defined in accordance with a frequency, scrambling code, etc. That is, the illustrated geographically-defined cells 502, 504, and 506 may each be further divided into a plurality of cells, e.g., by utilizing different carrier frequencies or scrambling codes. For example, cell 504a may utilize a first carrier frequency or scrambling code, and cell 504b, while in the same geographic region and served by the same Node B 544, may be distinguished by utilizing a second carrier frequency or scrambling code.

In a cell that is divided into sectors, the multiple sectors within a cell can be formed by groups of antennas with each antenna responsible for communication with UEs in a portion of the cell. For example, in cell 502, antenna groups 512, 514, and 516 may each correspond to a different sector. In cell 504, antenna groups 518, 520, and 522 each correspond to a different sector. In cell 506, antenna groups 524, 526, and 528 each correspond to a different sector.

The cells 502, 504 and 506 may include several UEs that may be in communication with one or more sectors of each cell 502, 504 or 506. For example, UEs 530 and 532 may be in communication with Node B 542, UEs 534 and 536 may be in communication with Node B 544, and UEs 538 and 540 may be in communication with Node B 546. Here, each Node B 542, 544, 546 is configured to provide an access point to a core network 204 (see FIG. 2) for all the UEs 530, 532, 534, 536, 538, 540 in the respective cells 502, 504, and 506.

For example, during a call with the source cell 504a, or at any other time, the UE 536 may monitor various parameters of the source cell 504a as well as various parameters of neighboring cells such as cells 504b, 506, and 502. Further, depending on the quality of these parameters, the UE 536 may maintain communication with one or more of the neighboring cells. During this time, the UE 536 may maintain an Active Set, that is, a list of cells that the UE 536 is simultaneously connected to (i.e., the UTRA cells that are currently assigning a downlink dedicated physical channel DPCH or fractional downlink dedicated physical channel F-DPCH to the UE 536 may constitute the Active Set). Here, cells may be added to or deleted from the Active Set utilizing RRC signaling such as messages called event 1A and event 1B, and corresponding reconfiguration messages.

In a serving cell change (SCC) procedure, the UE requests that the serving cell be changed from the currently serving source cell to a target cell. This request is sent to the UTRAN through an RRC message called event 1D. The UTRAN and the UE exchange several messages and when the procedure is complete the HS data is served from the target cell.

A high speed packet access (HSPA) air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

In Release 5 of the 3GPP family of standards, High Speed Downlink Packet Access (HSDPA) was introduced. One difference on the downlink between HSDPA and the previously standardized circuit-switched air-interface is the absence of soft handover in HSDPA. This means that data is transmitted to the UE from a single cell called the HSDPA serving cell. As the user moves, or as one cell becomes preferable to another, the HSDPA serving cell may change.

In Rel. 5 HSDPA, at any instance a UE has one serving cell. Here, a serving cell is that cell on which the UE is camped. According to mobility procedures defined in Rel. 5 of 3GPP TS 25.331, the Radio Resource Control (RRC) signaling messages for changing the HSPDA serving cell are transmitted from the current HSDPA serving cell (i.e., the source cell), and not the cell that the UE reports as being the stronger cell (i.e., the target cell).

Further, with Rel. 5 HSDPA the UE generally monitors and performs measurements of certain parameters of the downlink channel to determine the quality of that channel. Based on these measurements the UE can transmit feedback to the Node B on an uplink transmission. This feedback can include a channel quality indicator (CQI). Thus, the Node B may transmit subsequent MAC-hs/MAC-ehs packets to the UE on downlink transmissions having a size, coding format, etc., based on the reported CQI from the UE.

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-PDSCH carries the actual data on the downlink, while the HS-SCCH is a downlink control channel used to provide control information to the UE about the information on the corresponding HS-PDSCH. The HS-DPCCH carries the HARQ ACK/NACK signaling on the uplink to indicate whether a corresponding packet transmission was decoded successfully. That is, with respect to the downlink, the UE transmits feedback to the Node B over the HS-DPCCH to indicate whether it correctly decoded a packet on the downlink.

HS-DPCCH further includes the feedback signaling from the UE to assist the Node B in taking the right decision in terms of modulation and coding scheme and precoding weight selection, this feedback signaling including the CQI and PCI. In this way, the Node B may adapt transmissions on the downlink channel in accordance with the feedback information corresponding to the downlink channel state.

HSPA-based mobile internet offerings are becoming very popular and data usage is increasing rapidly. Consequently, HSPA has begun to be deployed on more than one transmit antenna or more than one carrier. As an example, the single cell downlink MIMO (MIMO-Physical layer) feature was introduced to allow a Node B to transmit two transport blocks to a single UE from the same sector on a pair of transmit antennas, thus improving data rates at high geometries and providing a beamforming advantage to the UE in low geometry conditions. Subsequently, dual cell HSDPA (DC-HSDPA) and dual band (DB)-DC-HSDPA features were introduced, allowing the Node B to serve one or more users by simultaneous operation of HSDPA on two different frequency channels in the same sector, thus improving the user experience across the entire cell.

DC-HSDPA is a further enhancement to HSDPA that utilizes carrier aggregation on the downlink. That is, in DC-HSDPA, a Node B may transmit two HS-DSCH channels, i.e., a primary serving HS-DSCH cell (that generally carries data and control signaling) and a secondary serving HS-DSCH cell (that generally carries data channels only), on two carrier frequencies to a UE in order essentially to double the downlink throughput. As specified, DC-HSDPA provides the two HS-DSCH channels to a UE from a single sector, such that the scheduling of resources to that UE is consolidated into the single sector.

When a UE 534 (see FIG. 5) is using HSDPA service at the boundary of two neighboring sectors, the throughput of this service is often limited due to inter-sector interference or low signal quality from the serving sector. Due to interference from a neighboring sector and/or due to a weak signal from the serving sector the terminal might only get served with a very limited data rate. Thus, in a DC-HSDPA system, when the quality of one or both HS-DSCH channels degrades, the sector may simply hand over to another sector, which may then transmit the dual cells to the UE.

The common aspect of DC-HSDPA and dual band DC-HSDPA is that they allow for simultaneous downlink reception of two independent transport blocks at the UE, where the transport blocks are transmitted on the HS-DSCH by a single Node B sector. Although these features significantly enhance the peak user as well as the average user throughput throughout the cell, there is an evident desire for even better and more consistent user experience in the outer area of the cell coverage.

It is expected that for many years to come, HSPA networks would still contain many macro-cellular sites where a single carrier frequency is deployed for HSDPA. The restriction to single frequency operation could be due to the fact that an operator has limited spectrum (e.g., an operator may have a single 5 MHz carrier). In these single carrier frequency networks where DC-HSDPA capable UEs become available, the current UMTS specifications do not allow for such UEs to receive two transport blocks simultaneously from two different sectors on the same frequency. As a consequence, the second receive chain of the DC-HSDPA UE would remain idle in these networks.

Similarly, it is expected that in the near future, in many dense urban areas, HSPA networks would contain many macro-cellular sites where dual frequencies are deployed for HSDPA. In these dual carrier frequency networks where 4C-HSDPA capable UEs become available, the current UMTS specifications do not allow for such UEs to receive 3 to 4 transport blocks simultaneously from a pair of sectors across the dual frequencies. As a consequence, the third and fourth receive chains of the 4C-HSDPA UE would remain idle in these networks.

Furthermore, in a realistic deployment, the system is infrequently fully utilized. A partially loaded system is a common scenario in practice. If a DC-HSDPA or a 4C-HSDPA capable UE falls into the soft or softer handover coverage region of two sectors, when the sector corresponding to the link from the primary serving HS-DSCH cell is capacity constrained and the non-serving sector in its active set is partially loaded—i.e., the non-serving sector has available power and codes that are not fully utilized on the HS-PDSCH—the non-serving cell can also schedule packets to this UE by taking advantage of the UE receiver capability and thereby achieving traffic offloading while providing an aggregate throughput gain for the users in the serving sector.

Similar to MIMO and DC-HSDPA, yet another technique is possible to transmit two independent transport blocks to the UE in a soft/softer handover region, wherein the transport blocks are simultaneously transmitted from two different Node B sectors on a single frequency. A DC-HSDPA or 4C-HSDPA-like UE capable of a Type 3i implementation (i.e., including an interference-aware receiver) in each configured frequency can significantly suppress the interference from one sector on that frequency while it decodes the packet from the other sector. Also, if a DC-HSDPA or 4C-HSDPA like UE is only capable of a single Rx antenna per configured frequency, it should still be possible to provide such UEs an improved user experience by allowing for dynamic scheduling of a single (if UE is configured on a single frequency) or dual transport blocks (if UE is configured on dual frequencies) from one of the two sectors in any given TTI.

Figure 6:
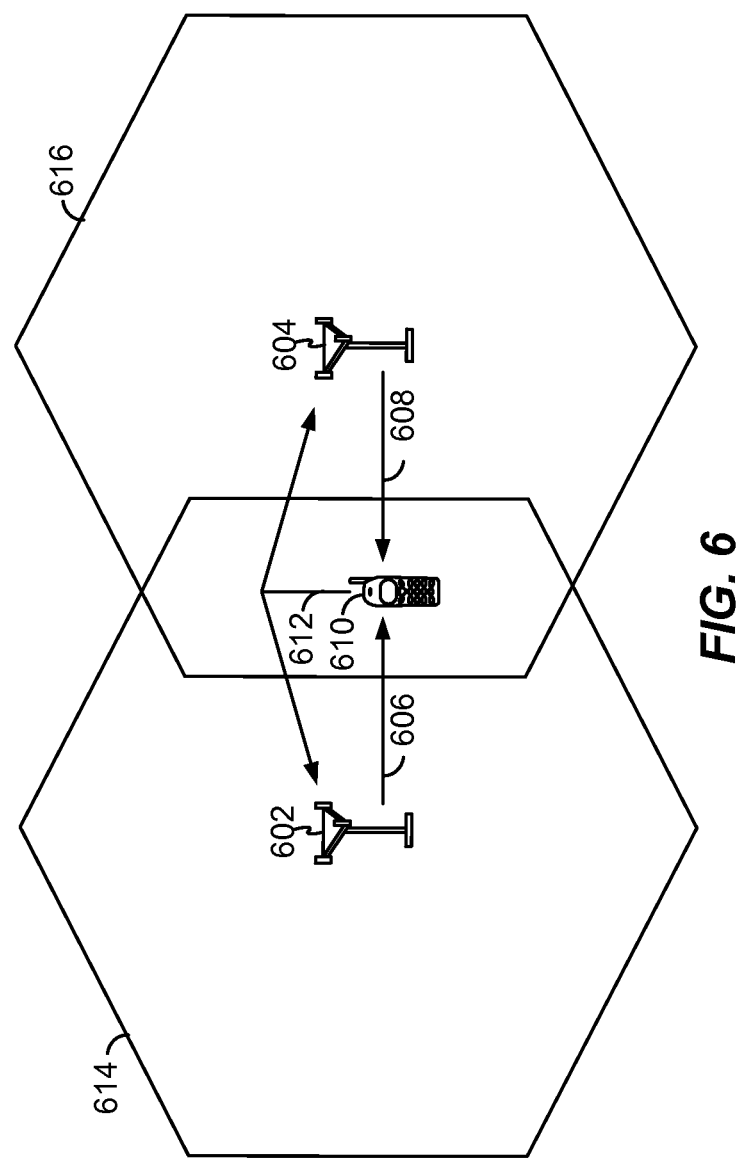
FIG. 6 is a conceptual diagram illustrating an example of an access network transmitting SFDC-HSDPA service.

In an aspect of the present disclosure, as illustrated in FIG. 6, it may be beneficial to have a geographic overlap between two or more sectors 614 and 616 from respective Node Bs 602 and 604, such that a UE 610 may be served, at least for a certain period of time, by the multiple sectors. Thus, a wireless telecommunications system in accordance with the present disclosure may transmit HSDPA service 606 and 608 from a plurality of sectors on a single carrier frequency. For example, a setup utilizing two sectors may be referred to as Single Frequency Dual Cell HSDPA (SFDC-HSDPA). However, other terminology may be freely utilized, including but not limited to soft or softer aggregation, Coordinated Multi-Point HSDPA (CoMP), or simply Multipoint HSDPA. In such a system, the UE 610 may transmit a single uplink 612 including feedback for both sectors 614 and 616. In this way, users at sector boundaries, as well as the overall system, may benefit from a high throughput. Here, the different sectors may be transmitted by the same Node B, or, as illustrated, the different sectors may be transmitted by different Node Bs 602 and 604.

FIG. 6 is a conceptual diagram illustrating a SFDC-HSDPA system in accordance with an exemplary aspect of the disclosure. In the scheme illustrated in FIG. 6, two Node Bs 602 and 604 each transmit a downlink channel 606 and 608, respectively, wherein the downlink channels are in substantially the same carrier frequency. Of course, as already described, in another aspect, both downlink carriers 606 and 608 may be transmitted from different sectors of the same Node B. Here, the UE 610 receives the downlink channels and transmits an uplink channel 612, which is received by both Node Bs 602 and 604. The uplink channel 612 from the UE 610 may provide feedback information, e.g., corresponding to the downlink channel state for the corresponding downlink channels 606 and 608.

Those skilled in the art will comprehend that certain aspects of SFDC-HSDPA may be similar to a soft handover. That is, a user may simultaneously receive downlink information from dual sectors, increasing both throughput and reliability, while certain uplink transmissions are provided to each of the dual sectors. Thus, for example, when a user is at a boundary of two sectors, the expected poor performance resulting, for example, from inter-sector interference, may be reduced or avoided. That is, if a user is served by a first sector, and if a second sector improves, the serving sector may be changed such that the user may be served by the better suited sector. E.g., at a certain geographic location where the areas corresponding to two sectors overlap or touch each other, it may be difficult to determine which sector is better, and further, the designation of which sector is better may rapidly change over time at a border. Thus, it may be useful to transfer data from both sectors simultaneously. In this way a user may be better served at the boundary area.

If a UE is capable of both DC-HSDPA (aggregating carriers in different carrier frequencies) and SFDC-HSDPA (aggregating carriers in the same carrier frequency), then in some cases it may be beneficial to configure the UE to receive transport blocks simultaneously from a pair of serving HS-DSCH cells where each cell is configured on a different frequency, while in other cases it may be beneficial to configure the UE to receive transport blocks simultaneously from a pair of serving HS-DSCH cells where each cell is configured on the same frequency. That is, it may be beneficial to provide a capability to select between a first secondary serving HS-DSCH cell in a different carrier frequency than that of the primary serving HS-DSCH cell, and a second secondary serving HS-DSCH cell in the same carrier frequency as the primary serving HS-DSCH cell. In various aspects of the present disclosure, consideration of various factors to decide between the respective cells, and a trigger to switch a UE between these two modes, is provided. Further aspects of the present disclosure provide signaling to enable a network to dynamically configure the UE between these two modes.

Figure 7A:
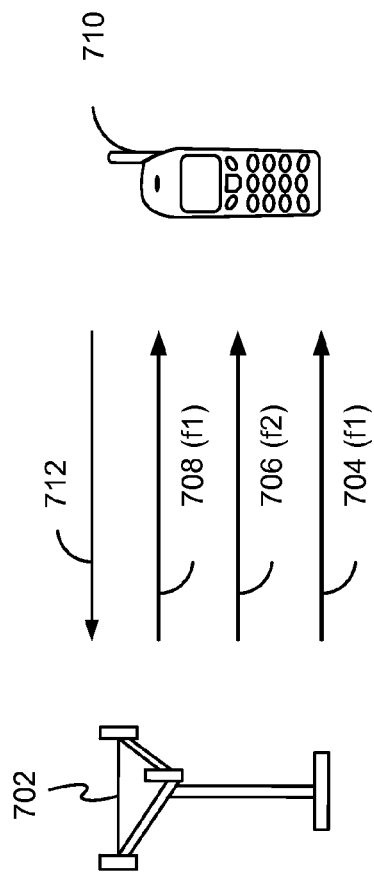
FIGS. 7a and 7b are conceptual diagrams illustrating the provision of DC-HSDPA and SFDC-HSDPA to a UE capable of receiving at least one secondary serving cell in either technology.
Figure 7B:
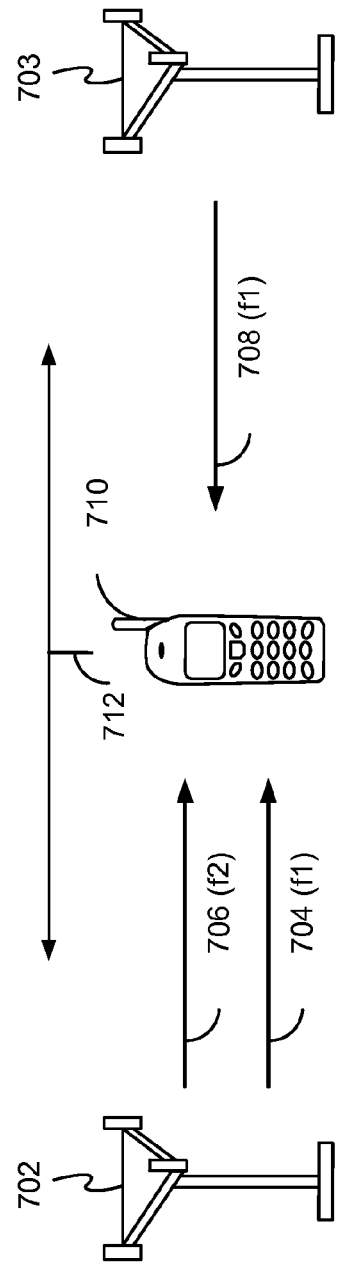

FIG. 7a is a schematic illustration of a Node B 702 transmitting three HS-DSCH cells 704, 706, and 708, and a UE 710 at a suitable location where it may receive one or more of the cells. Further, the UE 710 as illustrated may provide an uplink transmission 712, e.g., including data and/or control information that may be received by the Node B 702. For example, the uplink transmission 712 may include an HS-DPCCH carrying information such as a CQI feedback to the Node B 702 corresponding to received HSDPA channel(s). FIG. 7b is a schematic illustration of the same Node B 702 transmitting two HS-DSCH cells 704 and 706, while a disparate Node B 703 transmits a third HS-DSCH cell 708. In the illustrated example, cell 704 is transmitted at a first carrier frequency f1, cell 706 is transmitted at a second carrier frequency f2, and cell 708 is transmitted at the first carrier frequency f1. FIG. 7b is provided to illustrate that in various aspects of the present disclosure, it is not necessary that all the cells are transmitted by the same Node B 702. Further, while the illustration provides that the disparate Node B 703 transmits a cell 708 at the first carrier frequency f1, in other aspects of the present disclosure the disparate Node B 703 may transmit the cell 708 at the second carrier frequency f2. That is, although current specifications for DC-HSDPA require that the dual carriers utilized for downlink transmissions are provided by the same Node B, aspects of the present disclosure may be utilized in embodiments wherein the dual cells in different carrier frequencies are transmitted by disparate Node Bs, and aggregated by the UE 710. This scheme may be referred to as dual frequency, dual cell (DF-DC)-HSDPA.

While the description that follows refers to the configuration illustrated in FIG. 7a, those of ordinary skill in the art will comprehend that the secondary serving cells may be transmitted from the same Node B or a different Node B from that one transmitting the primary serving cell.

In one aspect of the disclosure, as illustrated in FIG. 7a, a UE 710 may be served by a primary serving HS-DSCH cell 704 at the first carrier frequency f1. Here, the primary serving HS-DSCH cell 704 may be transmitted by the Node B 702, or may be transmitted by another node in the network, such as an RNC 306 (see FIG. 3) utilizing the Node B 702. Here, the UE 710 may be preconfigured with a first secondary serving HS-DSCH cell 706 on a second carrier frequency f2 that is different from the first carrier frequency f1 on which the primary serving HS-DSCH cell 704 is configured (as in DC-HSDPA or DB-DC-HSDPA), as well as with a second secondary serving HS-DSCH cell 708 on the first carrier frequency f1 on which the primary serving HS-DSCH cell 704 is configured (as in SFDC-HSDPA). Here, the UE 710 may be preconfigured for both the first secondary serving HS-DSCH cell 706 and the second secondary serving HS-DSCH cell 708 by instructing the UE 710 to monitor the HS-SCCH corresponding to each of the secondary serving HS-DSCH cells 706 and 708. In this way, by reading the respective HS-SCCHs, the UE 710 may be provided with the necessary information to quickly decode the selected respective HS-DSCH cell.

Of course, other suitable methods of preconfiguration may be utilized, such as transmitting preconfiguration information for each of the first secondary serving HS-DSCH cell 706 and the second secondary serving HS-DSCH cell 708 on a suitable control channel from the primary serving cell 704. In some aspects of the present disclosure, the configuration message for preconfiguring the UE 710 may come in the form of an RRC configuration message from the RNC. In another aspect of the disclosure, an HS-SCCH order may be transmitted, e.g., over the primary serving cell, containing preconfiguration information. Of course, any suitable message for carrying configuration information for preconfiguring the UE 710 may be utilized within the scope of the present disclosure.

Further, in some aspects of the disclosure, preconfiguration of the UE 710 may not be necessary, and may be omitted if the UE 710 is capable of dynamically switching between the respective carriers as described below, without requiring any such preconfiguration.

Figure 8:
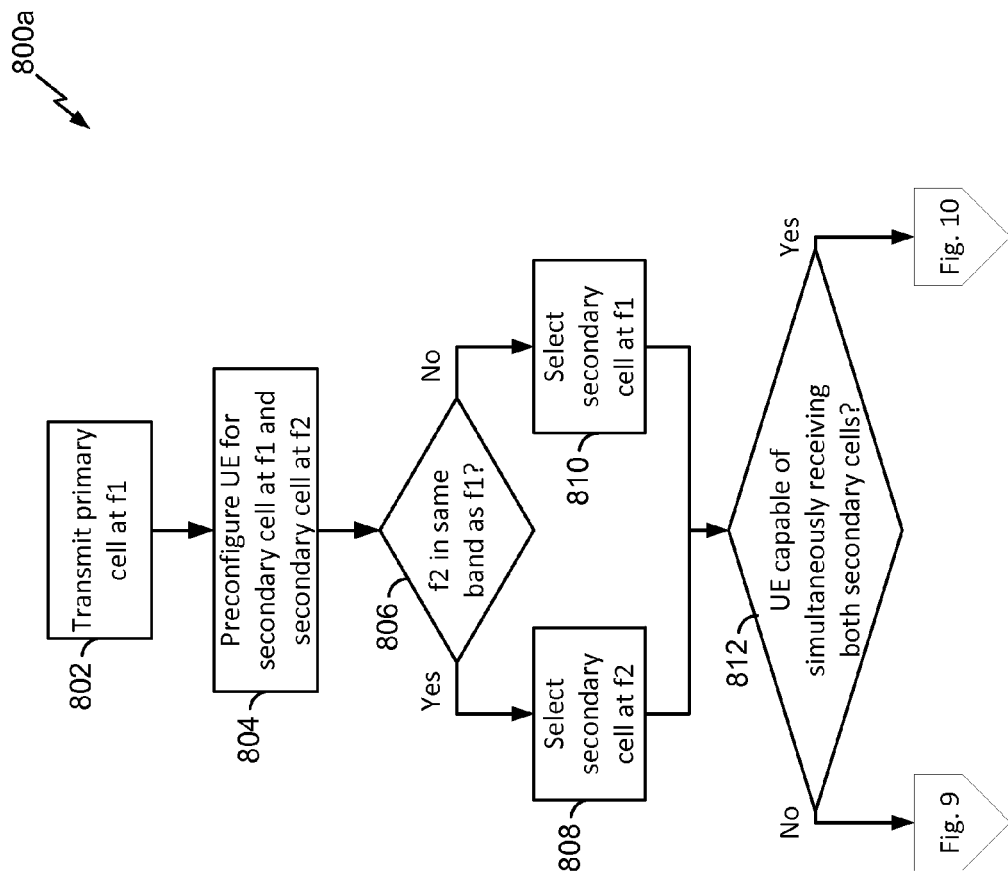
FIGS. 8-10 are a flow chart illustrating a process of dynamically selecting among secondary serving cells for a UE capable of receiving at least one secondary serving cell in either of DC-HSDPA or SFDC-HSDPA.
Figure 9:
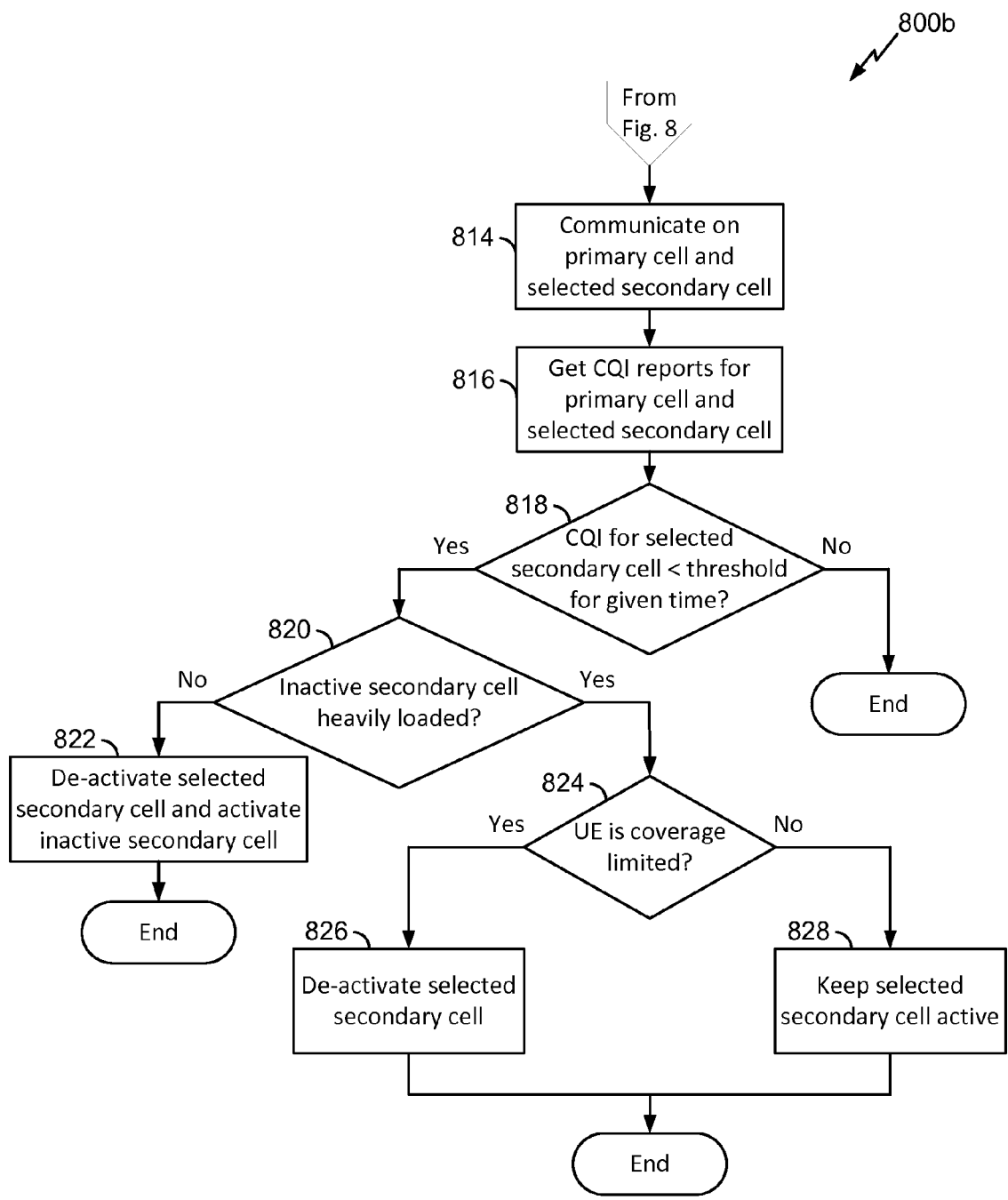
Figure 10:
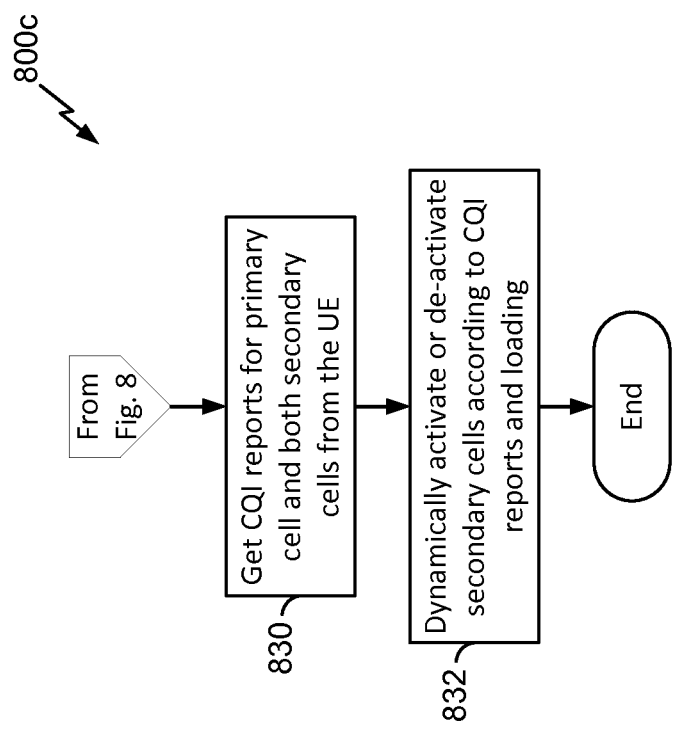

FIGS. 8-10 provide a flow chart 800a-800c illustrating an exemplary method of dynamically selecting among the secondary serving HS-DSCH cells 706 and 708 in accordance with some of the aspects of the present disclosure. The description that follows will refer to the flow chart 800a-800c and the corresponding schematic diagram shown in FIG. 7a. That is, the process illustrated in flow chart 800a-800c may be implemented by the Node B 702, by an RNC 306 (see FIG. 3), by any processing system 114 (see FIG. 1), or by any suitable apparatus or means for carrying out the described functions. For clarity, reference will be made to the example shown in FIG. 7a.

In block 802, the process may provide, e.g., from a corresponding sector of the Node B 702, a primary serving HS-DSCH cell at a first frequency f1 to the UE 710. In block 804, the process may optionally preconfigure the UE 710 for the first secondary serving HS-DSCH cell at a second frequency f2, and preconfigure the UE 710 for the second secondary serving HS-DSCH cell at the first frequency f1 as described above. For example, preconfiguration information may be transmitted by way of an RRC configuration message, an HS-SCCH order, or any other suitable format.

By default, if the UE 710 is active, i.e., served by a primary serving HS-DSCH cell 704 as provided in block 802, the Node B 702 could activate either the first secondary serving HS-DSCH cell 706 or the second secondary serving HS-DSCH cell 708. In accordance with an aspect of the present disclosure, selection between the respective secondary serving HS-DSCH cells may consider UE battery consumption as a factor. For example, in block 806, to achieve the default configuration the process may determine whether the second carrier frequency f2 corresponding to the first secondary serving HS-DSCH cell 706 is in the same band as the first carrier frequency f1 corresponding to the primary serving HS-DSCH cell 704. If the carriers are in the same band, then in block 808 the process may activate the first secondary serving HS-DSCH cell 706. Alternatively, if the first secondary serving HS-DSCH cell 706 is configured in a band that does not contain the carrier frequency f1 on which the primary serving HS-DSCH cell 704 is configured, then in block 810 the process may activate the second secondary serving HS-DSCH cell 708.

That is, if the first secondary serving HS-DSCH cell 706 (at frequency f2) lies in the same band as the primary serving HS-DSCH cell 704 (at frequency f1) (e.g., in a DC-HSDPA configuration), then a single receive chain or a single RF front-end may be utilized in the UE 710 to receive both cells, thereby utilizing relatively little battery power. On the other hand, if the first secondary serving HS-DSCH cell 706 (at frequency f2) lies in a different band from the primary serving HS-DSCH cell 704 (e.g., in a DB-DC-HSDPA configuration), then if it is received then the UE 710 is generally required to utilize dual receive chains, or dual RF front-ends, resulting in relatively higher batter power consumption and making selection of the second secondary serving HS-DSCH cell 708 at the first frequency f1 (e.g., in a SFDC-HSDPA configuration) the more suitable choice.

Therefore, one factor that a network may consider in selecting which secondary serving HS-DSCH cell to utilize may be whether the first secondary serving HS-DSCH cell 706 lies within the same band as the primary serving HS-DSCH cell 704. Here, if the first secondary serving HS-DSCH cell 706 at the second frequency f2 is in a different band than the primary serving HS-DSCH cell 704, then in block 810 the Node B 702 may select the second secondary serving cell 708 at the first frequency f1 (i.e., the same carrier frequency as the primary serving HS-DSCH cell 704) in a softer aggregation configuration.

The signaling between the network and the UE 710 to indicate the selection of the first or second secondary serving HS-DSCH cell may be transmitted in any suitable format. In some aspects of the disclosure, the network (e.g., the Node B 702) may utilize HS-SCCH orders to activate one or both of the first secondary serving HS-DSCH cell 706 or the second secondary serving HS-DSCH cell 708, or to de-activate one or both of the first secondary serving HS-DSCH cell 706 or the second secondary serving HS-DSCH cell 708. That is, blocks 808 and 810 may include the utilization of such HS-SCCH orders from the Node B 702 to the UE 710.

For this purpose, in some aspects of the disclosure the existing Rel-10 HS-SCCH order table introduced for 4C-HSDPA can be re-used, wherein the orders used to de-activate/activate the $2^{nd}$ secondary serving HS-DSCH cell and activate/de-activate the $1^{st}$ secondary serving HS-DSCH cell can be re-purposed to de-activate/activate the first secondary serving HS-DSCH cell 706 and activate/de-activate the second secondary serving HS-DSCH cell 708 described herein. In another aspect of the disclosure, a new HS-SCCH order type may be introduced, different from the standardized HS-SCCH orders described in the 3GPP Rel-10 standards, which are publically available.

In yet another aspect of the disclosure, activating or de-activating one or both of the secondary serving HS-DSCH cells may be performed by the RNC, e.g., utilizing RRC configuration messages or another suitable L3 configuration message. That is, blocks 808 and 810 may include the utilization of such RRC configuration messages from the RNC 306 to the UE 710. However, as those of ordinary skill in the art will recognize, this procedure may be slower than utilizing HS-SCCH orders as described above.

In some aspects of the present disclosure, the UE 710 may be capable of simultaneously receiving more than one secondary serving HS-DSCH cell. That is, a more advanced UE may be capable of simultaneously receiving the HS-DSCH on the downlink from the primary serving HS-DSCH cell 704 at the first frequency f1, from the first secondary serving HS-DSCH cell 706 at the second frequency f2, and from the second secondary serving HS-DSCH cell 708 at the first frequency f1. Clearly, the selection of one or both of the first or second secondary serving HS-DSCH cells 706 and 708 may depend on whether the UE can simultaneously receive both. Thus, in block 812, the process may determine whether the UE 710 is capable of simultaneously receiving both the first secondary serving HS-DSCH cell 706 and the second secondary serving HS-DSCH cell 708. If the UE 710 is capable, the UE 710 may accordingly monitor the P-CPICH for each of the respective cells and transmit CQI reports for each of the primary serving HS-DSCH cell 704, the first secondary serving HS-DSCH cell 706, and the second secondary serving HS-DSCH cell 708 utilizing CQI reporting procedures as defined, for example, in 3GPP TS 25.214, Release 10 or later, for 4C-HSDPA. Of course, this is only one example provided for clarity, and any suitable format for transmitting channel quality reports corresponding to the respective downlink channels may be utilized. Thus, in block 830, the process may receive the CQI reports for both secondary serving HS-DSCH cells. Here, in accordance with the CQI reports from the UE 710, and if available, the loading of the respective cells as described below, in block 832 the Node B 702 can dynamically determine to activate or deactivate either one or both of the secondary serving HS-DSCH cells.

Returning now to block 812, if the UE 710 is not capable of simultaneously receiving both the first secondary serving HS-DSCH cell 706 and the second secondary serving HS-DSCH cell 708, or if for any reason the process determines that only one of the first secondary serving HS-DSCH cell 706 or the second secondary serving HS-DSCH cell 708 should be utilized by the UE 710, then the process may move to block 814. In block 814, the network may communicate with the UE 710 utilizing the primary serving HS-DSCH cell 704 and the initially selected one of the first secondary serving HS-DSCH cell 706 and the second secondary serving HS-DSCH cell 708, as selected in block 808 or 810 as described above. Here, one nomenclature that may be utilized is that the UE 710 communicating over the primary serving HS-DSCH cell 704 and the initially selected secondary serving HS-DSCH cell as selected in block 808 or 810 is in its "default" configuration, from whence a dynamic selection between the available secondary serving HS-DSCH cells may be made as described below.

That is, upon determining the default configuration for the UE 710 and utilizing the selected secondary serving HS-DSCH cell, conditions of the channel may change, and thus it may be desired for the network to dynamically switch between the first secondary serving HS-DSCH cell 706 and the second secondary serving HS-DSCH cell 708. In accordance with various aspects of the disclosure, the selection between the respective serving HS-DSCH cells may be made in accordance with one or more of CQI reports transmitted by the UE 710, loading conditions at one or more of the respective cells, or coverage limitations for the UE 710.

For example, in block 816, the network may receive CQI reports from the primary serving HS-DSCH cell 704 and the selected secondary serving HS-DSCH cell. Here, because as determined in block 812 the UE 710 may be only capable of receiving a single secondary serving HS-DSCH cell, CQI reports transmitted by the UE 710 on an uplink transmission 712 may correspond only to the primary serving HS-DSCH cell 704 and the selected one of the secondary serving HS-DSCH cells 706 or 708. That is, the network may lack CQI information corresponding to the inactive one of the available secondary serving HS-DSCH cells. Therefore, in accordance with some aspects of the present disclosure, other considerations in addition to CQI information may be taken into account when determining when to select between the available secondary serving HS-DSCH cells.

In accordance with some aspects of the disclosure such as the example illustrated in FIG. 7a, wherein a common Node B 702 transmits all three of the primary serving HS-DSCH cell 704, the first secondary serving HS-DSCH cell 706, and the second secondary serving HS-DSCH cell 708, loading conditions on each of the respective serving HS-DSCH cells may easily be taken into account in considering which secondary serving HS-DSCH cell to select. In another example such as the one illustrated in FIG. 7b wherein one of the secondary serving cells is transmitted by a disparate Node B different from the Node B transmitting the primary serving cell, it may still be possible to take into account the loading conditions of each of the respective serving HS-DSCH cells, however, communication amongst the Node Bs, or with another node in the network, and the corresponding delays for such communication should be taken into account.

Thus, in block 818, the process may determine whether CQI reports corresponding to the activated secondary serving HS-DSCH cell are low, e.g., lower than a threshold (e.g., a predetermined threshold) for a certain period of time. If the network determines in block 818 that the CQI corresponding to the activated secondary serving HS-DSCH cell indicates adequate channel conditions, then the process may end, since the network may determine not to change the secondary serving HS-DSCH cell. However, if the network determines that the CQI reports corresponding to the activated secondary serving HS-DSCH cell are low, then the process may move to block 820, wherein the network may determine whether the inactive secondary serving HS-DSCH cell is heavily loaded. Here, if the network determines in block 820 that the inactive secondary serving HS-DSCH cell is not heavily loaded, and therefore available, then the process may move to block 822, wherein the network may determine to de-activate the active secondary serving HS-DSCH cell, and activate the inactive secondary serving HS-DSCH cell.

On the other hand, if in block 820 the process determines that the inactive secondary serving HS-DSCH cell is heavily loaded, then the process may move to block 824, wherein the network may determine whether the UE 710 is coverage limited. For example, a UE may be considered coverage limited when the UE power headroom results in limitations on the UE utilization of the cell. Here, if the network determines in block 824 that the UE 710 is coverage limited, the process may move to block 826, wherein the network may de-activate the selected secondary serving HS-DSCH cell. That is, if the loading of the inactive secondary serving HS-DSCH cell might otherwise over-ride the considerations relating to the CQI reports from the activated secondary serving HS-DSCH cell, but keeping the activated secondary serving HS-DSCH cell, active, is not a desirable option because the UE 710 is coverage limited, the active secondary serving HS-DSCH cell may be de-activated. Here, the UE 710 may go to conventional single-cell HSDPA service.

Alternatively, if in block 824 the network determines that the UE 710 is not coverage limited, then the process may move to block 828, wherein the network may determine to keep the activated secondary serving HS-DSCH cell, activated. That is, the loading of the inactive secondary serving HS-DSCH cell may over-ride considerations relating to the CQI reports from the activated secondary serving HS-DSCH cell, such that maintaining the activated secondary serving HS-DSCH cell is appropriate.

In various aspects of the disclosure, the loading of the cell, which may be taken into consideration for a selection of one or the other secondary serving HS-DSCH cell, may be determined in accordance with any suitable number of relevant factors. For example, in some aspects of the disclosure, the loading calculation for determining the loading of the active secondary serving HS-DSCH cell or the inactive secondary serving HS-DSCH cell may depend on slot utilization for the respective cell, or downlink transmit power utilization at that cell. Further, loading of the respective secondary serving HS-DSCH cells may depend on the scheduling algorithms utilized by the Node B 702. For example, in the case that the Node B utilizes a round robin or classic proportional fair scheduler, the loading can be calculated in accordance with the effective number of users. Here, a user may be counted in the effective number of users in accordance with the fraction of the last time period that that user was active. The time period may be a parameter configured by the loading calculation algorithm.

Thus, the calculated loading can be combined with the CQI reported by a user to predict the throughput that user could attain if the new secondary serving cell is activated. The predicted throughput can then be used to compare different configurations of the secondary serving cell. In some aspects of the disclosure, the throughput prediction may be calculated by the Node B and forwarded to RNC for the particular user. In some other aspects of the disclosure, the RNC may carry out this calculation based on its knowledge of user activity and CQI information which can be reported by Node B or inferred from the measurement reports.

Upon determining to change the secondary serving HS-DSCH cell, in some aspects of the disclosure the network may transmit to the UE 710 an HS-SCCH order as described above, instructing the UE 710 to activate/de-activate the appropriate secondary serving HS-DSCH cell.

Several aspects of a telecommunications system have been presented with reference to a W-CDMA system. As those skilled in the art will readily appreciate, various aspects described throughout this disclosure may be extended to other telecommunication systems, network architectures and communication standards. By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of dynamically switching secondary serving cells, the method comprising:
   transmitting a primary serving cell at a first carrier frequency to a user equipment;
   preconfiguring the user equipment to receive a first secondary serving cell at a second carrier frequency and a second secondary serving cell at the first carrier frequency, wherein the first secondary serving cell corresponds to dual cell high speed downlink packet access (DC-HSDPA) and the second secondary serving cell corresponds to single frequency, dual cell high speed downlink packet access (SFDC-HSDPA);
   determining, based in part on channel quality indicator (CQI) reports transmitted by the user equipment and loading of at least one of the first secondary serving cell or the second secondary serving cell, whether to dynamically switch between the first secondary serving cell and the second secondary serving cell; and
   transmitting a configuration message to instruct the user equipment to select at least one of the first secondary serving cell or the second secondary serving cell, wherein the configuration message is configured to instruct the user equipment to: select the second secondary serving cell when the first carrier frequency and the second carrier frequency are in the same band, and select the first secondary serving cell when the first carrier frequency and the second carrier frequency are in different bands.

2. The method of claim 1, wherein the configuration message comprises a high-speed shared control channel (HS-SCCH) order generated by a base station.

3. The method of claim 1, wherein the configuration message comprises a radio resource control (RRC) configuration message generated by a radio network controller.

4. The method of claim 1, wherein the configuration message is based on the CQI reports transmitted by the user equipment and loading of at least one of the first secondary serving cell or the second secondary serving cell, wherein the loading of the at least one of the first secondary serving cell second or the secondary serving cell is determined based on slot utilization at the first secondary serving cell or the second secondary serving cell.

5. The method of claim 4, further comprising:
   determining whether the user equipment is coverage limited; and
   when it is determined that the user equipment is coverage limited, de-activating the selected first or second secondary serving cell.

6. The method of claim 1, wherein the primary serving cell, the first secondary serving cell, and the second secondary serving cell belong to a single Node B.

7. The method of claim 6, wherein the primary serving cell, the first secondary serving cell, and the second secondary serving cell are co-located.

8. The method of claim 6, wherein at least one of the first secondary serving cell or the second secondary serving cell comprises a distributed antenna system (DAS) and is not co-located with the primary serving cell.

9. A method of wireless communication for a user equipment configured to dynamically switch secondary serving cells, the method comprising:
   receiving a primary serving cell at a first carrier frequency;
   receiving preconfiguration information to preconfigure the user equipment to receive a first secondary serving cell at a second carrier frequency and a second secondary serving cell at the first carrier frequency, wherein the first secondary serving cell corresponds to dual cell high speed downlink packet access (DC-HSDPA) and the second secondary serving cell corresponds to single frequency, dual cell high speed downlink packet access (SFDC-HSDPA), and wherein the user equipment is configured to dynamically switch secondary serving cells by switching between the DC-HSDPA and the SFDC-HSDPA;

receiving a configuration message that includes instructions to select at least one of the first secondary serving cell or the second secondary serving cell, the configuration message being based in part on channel quality indicator (CQI) reports transmitted by the user equipment and loading of the first secondary serving cell or the second secondary serving cell; and receiving the selected secondary serving cell, in response to the configuration message, wherein the configuration message is configured to instruct the user equipment to: select the second secondary serving cell when the first carrier frequency and the second carrier frequency are in the same band, and select the first secondary serving cell when the first carrier frequency and the second carrier frequency are in different bands.

10. The method of claim 9, wherein the configuration message comprises a high-speed shared control channel (HS-SCCH) order generated by a base station.

11. The method of claim 9, wherein the configuration message comprises a radio resource control (RRC) configuration message generated by a radio network controller.

12. The method of claim 9, wherein the configuration message is based on the CQI report corresponding to the selected secondary serving cell and loading of at least one of the first secondary serving cell or the second secondary serving cell, wherein the loading of the at least one of the first secondary serving cell or the second secondary serving cell is determined based on slot utilization at the first secondary serving cell or the second secondary serving cell.

13. The method of claim 12, further comprising:
determining whether the user equipment is coverage limited; and
when it is determined that the user equipment is coverage limited, de-activating the selected first or second secondary serving cell.

14. An apparatus for dynamically switching secondary serving cells, the apparatus comprising:
means comprising one or more processors for transmitting a primary serving cell at a first carrier frequency to a user equipment;
means comprising the one or more processors for preconfiguring the user equipment to receive a first secondary serving cell at a second carrier frequency and a second secondary serving cell at the first carrier frequency, wherein the first secondary serving cell corresponds to dual cell high speed downlink packet access (DC-HSDPA) and the second secondary serving cell corresponds to single frequency, dual cell high speed downlink packet access (SFDC-HSDPA);
means comprising the one or more processors for determining, based in part on channel quality indicator (CQI) reports transmitted by the user equipment and loading of at least one of the first secondary serving cell or the second secondary serving cell, whether to dynamically switch between the first secondary serving cell and the second secondary serving cell; and means comprising the one or more processors for transmitting a configuration message to instruct the user equipment to select at least one of the first secondary serving cell or the second secondary serving cell, wherein the configuration message is configured to instruct the user equipment to: select the second secondary serving cell when the first carrier frequency and the second carrier frequency are in the same band, and select the first secondary serving cell when the first carrier frequency and the second carrier frequency are in different bands.

15. The apparatus of claim 14, wherein the configuration message comprises a high-speed shared control channel (HS-SCCH) order generated by a base station.

16. The apparatus of claim 14, wherein the configuration message comprises a radio resource control (RRC) configuration message generated by a radio network controller.

17. The apparatus of claim 14, wherein the configuration message is based on the CQI reports transmitted by the user equipment and loading of at least one of the first secondary serving cell or the second secondary serving cell, wherein the loading of the at least one of the first secondary serving cell or the second secondary serving cell is determined based on slot utilization at the first secondary serving cell or the second secondary serving cell.

18. The apparatus of claim 17, further comprising:
means comprising the one or more processors for determining whether the user equipment is coverage limited; and
means comprising the one or more processors for, when it is determined that the user equipment is coverage limited, de-activating the selected first or second secondary serving cell.

19. The apparatus of claim 14, wherein the primary serving cell, the first secondary serving cell, and the second secondary serving cell belong to a single Node B.

20. The apparatus of claim 19, wherein the primary serving cell, the first secondary serving cell, and the second secondary serving cell are co-located.

21. The apparatus of claim 19, wherein at least one of the first secondary serving cell or the second secondary serving cell comprises a distributed antenna system (DAS) and is not co-located with the primary serving cell.

22. An apparatus for wireless communication configured to dynamically switch secondary serving cells, at a user equipment, the apparatus comprising:
means comprising one or more processors for receiving a primary serving cell at a first carrier frequency;
means comprising the one or more processors for receiving preconfiguration information to preconfigure to receive a first secondary serving cell at a second carrier frequency and a second secondary serving cell at the first carrier frequency, wherein the first secondary serving cell corresponds to dual cell high speed downlink packet access (DC-HSDPA) and the second secondary serving cell corresponds to single frequency, dual cell high speed downlink packet access (SFDC-HSDPA), and wherein the apparatus is configured to dynamically switch secondary serving cells by switching between the DC-HSDPA and the SFDC-HSDPA;
means comprising the one or more processors for receiving a configuration message that includes instructions to select at least one of the first secondary serving cell or the second secondary serving cell, the configuration message being based in part on channel quality indicator (CQI) reports transmitted by the user equipment and loading of the first secondary serving cell or the second secondary serving cell; and means comprising the one or more processors for receiving the selected secondary serving cell, in response to the configuration message, wherein the configuration message is configured to instruct the user equipment to: select the second secondary serving cell when the first carrier frequency and the second carrier frequency are in the same band, and select the first secondary serving cell when the first carrier frequency and the second carrier frequency are in different bands.

23. The apparatus of claim 22, wherein the configuration message comprises a high-speed shared control channel (HS-SCCH) order generated by a base station.

24. The apparatus of claim 22, wherein the configuration message comprises a radio resource control (RRC) configuration message generated by a radio network controller.

25. The apparatus of claim 22, wherein the configuration message is based on the CQI report corresponding to the selected secondary serving cell and loading of at least one of the first secondary serving cell or the second secondary serving cell, wherein the loading of the at least one of the first secondary serving cell or the second secondary serving cell is determined based on slot utilization at the first secondary serving cell or the second secondary serving cell.

26. The apparatus of claim 25, further comprising:
means comprising the one or more processors for determining whether the user equipment is coverage limited; and
means comprising the one or more processors for, when it is determined that the user equipment is coverage limited, de-activating the selected first or second secondary serving cell.

27. A computer program product, comprising:
a non-transitory computer-readable medium storing instructions thereon for dynamically switching secondary serving cells, the non-transitory computer-readable medium comprising:
instructions for causing a computer to transmit a primary serving cell at a first carrier frequency to a user equipment;
instructions for causing the computer to preconfigure a user equipment to receive a first secondary serving cell at a second carrier frequency and a second secondary serving cell at the first carrier frequency, wherein the first secondary serving cell corresponds to dual cell high speed downlink packet access (DC-HSDPA) and the second secondary serving cell corresponds to single frequency, dual cell high speed downlink packet access (SFDC-HSDPA);
instructions for causing the computer to determine, based in part on channel quality indicator (CQI) reports transmitted by the user equipment and loading of at least one of the first secondary serving cell or the second secondary serving cell, whether to dynamically switch between the first secondary serving cell and the second secondary serving cell; and
instructions for causing the computer to transmit a configuration message to instruct the user equipment to select at least one of the first secondary serving cell or the second secondary serving cell, wherein the configuration message is configured to instruct the user equipment to: select the second secondary serving cell when the first carrier frequency and the second carrier frequency are in the same band, and select the first secondary serving cell when the first carrier frequency and the second carrier frequency are in different bands.

28. A computer program product, comprising:
a non-transitory computer-readable medium storing instructions thereon for dynamically switching secondary serving cells, the non-transitory computer-readable medium comprising:
instructions for causing a computer to receive a primary serving cell at a first carrier frequency;
instructions for causing the computer to receive preconfiguration information to preconfigure to receive a first secondary serving cell at a second carrier frequency and a second secondary serving cell at the first carrier frequency, wherein the first secondary serving cell corresponds to dual cell high speed downlink packet access (DC-HSDPA) and the second secondary serving cell corresponds to single frequency, dual cell high speed downlink packet access (SFDC-HSDPA);
instructions for causing the computer to receive a configuration message that includes instructions to select at least one of the first secondary serving cell or the second secondary serving cell, the configuration message being based in part on channel quality indicator (CQI) reports transmitted by the user equipment and loading of the first secondary serving cell or the second secondary serving cell, wherein the configuration message is configured to instruct the user equipment to: select the second secondary serving cell when the first carrier frequency and the second carrier frequency are in the same band, and select the first secondary serving cell when the first carrier frequency and the second carrier frequency are in different bands; and
instructions for causing the computer to receive the selected secondary serving cell, in response to the configuration message.

29. An apparatus for dynamically switching secondary serving cells, the apparatus comprising:
at least one processor; and
a memory coupled to the at least one processor,
wherein the at least one processor is configured to:
transmit a primary serving cell at a first carrier frequency to a user equipment;
preconfigure the user equipment to receive a first secondary serving cell at a second carrier frequency and a second secondary serving cell at the first carrier frequency, wherein the first secondary serving cell corresponds to dual cell high speed downlink packet access (DC-HSDPA) and the second secondary serving cell corresponds to single frequency, dual cell high speed downlink packet access (SFDC-HSDPA);
determine, based in part on channel quality indicator (CQI) reports transmitted by the user equipment and loading of at least one of the first secondary serving cell or the second secondary serving cell, whether to dynamically switch between the first secondary serving cell and the second secondary serving cell; and
transmit a configuration message to instruct the user equipment to select at least one of the first secondary serving cell or the second secondary serving cell, wherein the configuration message is configured to instruct the user equipment to: select the second secondary serving cell when the first carrier frequency and the second carrier frequency are in the same band, and select first secondary serving cell when the first carrier frequency and the second carrier frequency are in different bands.

30. An apparatus for wireless communication for dynamically switching secondary serving cells, the apparatus comprising:

at least one processor; and a memory coupled to the at least one processor, wherein the at least one processor is configured to:

receive a primary serving cell at a first carrier frequency;

receive preconfiguration information to preconfigure to receive a first secondary serving cell at a second carrier frequency and a second secondary serving cell at the first carrier frequency, wherein the first secondary serving cell corresponds to dual cell high speed downlink packet access (DC-HSDPA) and the second secondary serving cell corresponds to single frequency, dual cell high speed downlink packet access (SFDC-HSDPA);

receive a configuration message that includes instructions to select at least one of the first secondary serving cell or the second secondary serving cell, the configuration message being based in part on channel quality indicator (CQI) reports transmitted by the user equipment and loading of the first secondary serving cell or the second secondary serving cell, wherein the configuration message is configured to instruct the user equipment to: select the second secondary serving cell when the first carrier frequency and the second carrier frequency are in the same band, and select the first secondary serving cell when the first carrier frequency and the second carrier frequency are in different bands; and receive the selected secondary serving cell, in response to the configuration message.

* * * * *